Figure 1:
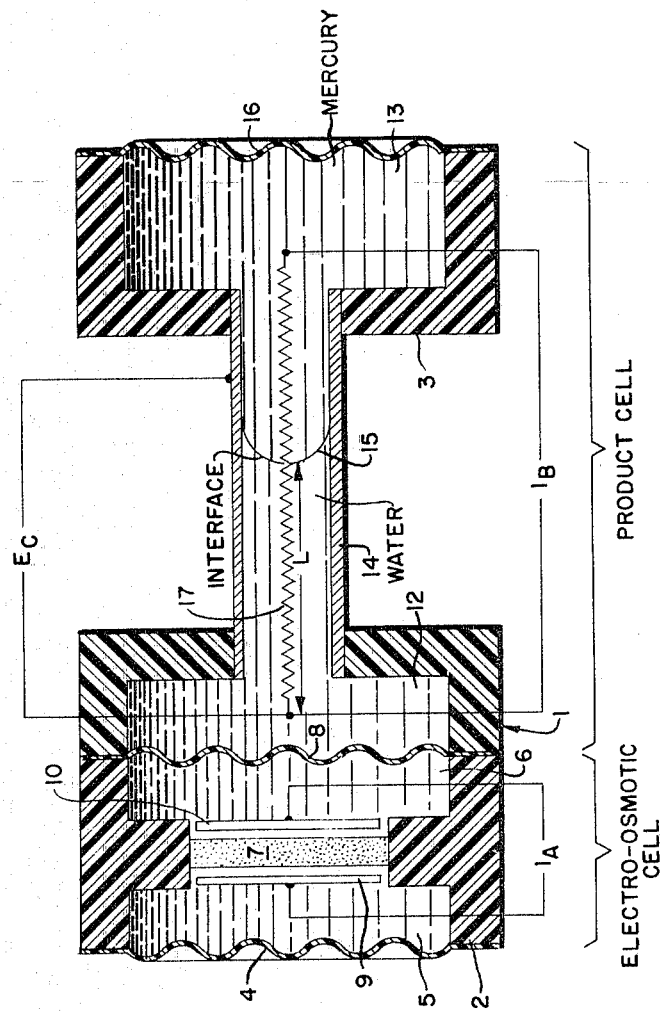

Jan. 3, 1967   R. M. HURD   3,296,466
COMBINATION ELECTRO-OSMOSIS CELL AND ELECTROLYTIC
DETECTING CELL
Filed June 28, 1955

INVENTOR
R. M. HURD

BY
ATTORNEYS

United States Patent Office 3,296,466
Patented Jan. 3, 1967

3,296,466
COMBINATION ELECTRO-OSMOSIS CELL AND ELECTROLYTIC DETECTING CELL
Ray M. Hurd, Austin, Tex., assignor, by mesne assignments, to the United States of America as represented by the Secretary of the Navy
Filed June 28, 1955, Ser. No. 518,693
4 Claims. (Cl. 310—2)

This invention relates to a device for providing a multiplication of electrical current from two separate inputs and effecting a multiplied combination thereof in the output which is proportional to the product of the two input currents.

More specifically, the invention relates to a new and novel structure combining an electro-osmosis cell device and an electrolytic detecting cell device as a combination providing a product circuit output.

Prior methods of combining two electrical currents or voltages to provide a product output have incorporated vacuum tube circuits which have considerably higher current and power requirements than those required of the instant device. An example of prior art devices is an electron tube circuit of a character adapted to include a pentagrid converter type tube as a multiplying stage wherein two different signals are applied to the respective signal grids of the tube and the output circuit provides for a current flow in the plate cathode circuit thereof which is proportional to the product of the two input signals. The operation of such an arrangement in a mine detector circuit or the like places strenuous power demand on the batteries therefor and materially shortens the useful life of the mine as compared to mines utilizing the instant multiplier device.

The instant invention incorporates an electro-osmotic cell of the general character described in the U.S. patent to E. V. Hardway, Jr., No. 2,661,430 dated December 1, 1953. In the instant invention the electro-osmotic cell is arranged in a unitary assembly to directly drive the multiplying cell and which includes a mercury chamber and a chamber containing a less viscous fluid such as water. The multiplying cell is provided with a common interconnecting passage or metal tube between the water chamber and the mercury chamber whereby a current fed to the electro-osmotic cell produces a fluid flow therein which displaces a common diaphragm between the two cell units and functions to move the mercury-water interface along the metal tube.

The multiplying chamber generally includes a diaphragm to close the mercury containing portion and has a closure of the water chamber by the diaphragm common to the electro-osmotic cell. Displacement of the capacitive diaphragm closing the mercury chamber by action of the fluid displaced by a current flow through the electro-osmotic cell builds up a back pressure which at some point will exactly balance the electro-osmotic force producing the flow. Thereafter an equilibrium position of the mercury water interface is reached.

Disposed in the column or passage between the two chambers is a resistance wire so arranged that movement of the mercury water interface provides a tap along the resistance wire and thereby provides a variable resistance through which a first current to be multiplied is caused to flow and from which a multiplied signal voltage proportional to the product of this current and the current applied to the electro-osmotic cell is obtained after movement of the interface with fluid flow in the column or passage. The position of the interface, and thus the length L, of the resistance wire exposed will be a linear function of $I_A$, the current flowing in the electro-osmotic cell circuit; i.e., $L = k_L I_A$. A second current $I_B$ which is in effect to be multiplied by $I_A$ is caused to flow through the resistance wire. The value of resistance in this circuit will be proportional to the length of wire exposed in the water side to provide the relation for resistance R i.e., $R = k_2 L = k_2 I_A$. The value $E_C$ of the voltage across the water exposed portion of the resistance wire will be $I_B R$, and since $R = k_2 I_A$ the product will be equal to $k_2 I_A I_B$.

It is therefore a feature of this invention to provide a product cell with a very low power consumption for providing an output which is proportional to the product of two input currents.

One object of the instant invention is to provide a device for multiplying a current flowing in a first circuit by a current flowing in a second circuit, and including means to provide for deriving an output therefrom which is proportional to the product of the two input currents.

It is another object of the invention to provide the foregoing multiplication in a system having very low power consumption requirements.

Another object of the invention is to provide a product cell which is relatively insensitive to shock and/or damage caused during handling.

Still another object of the invention is to provide a product cell of a character adapted for use in electrolytic circuitry of acoustic mine detection apparatus and which is substantially immune to effects of mine laying as by aircraft or the like.

Figure 2:
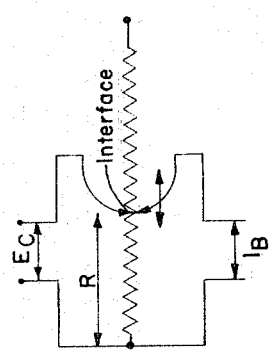

Other objects and many of the attendant advantages of this invention will be readily appreciated as the same becomes better understood by reference to the following detailed description when considered in connection with the accompanying drawings wherein:

FIG. 1 is a diagrammatic illustration of an electrolytic product cell comprising an electro-osmotic driver cell and a cell which includes means for varying the resistance of an element of an electrical circuit in response to fluid flow produced by driving action of the electro-osmotic cell; and FIG. 2 is a schematic diagram of the equivalent circuit of the driven portion of the product device of FIG. 1.

Referring now to FIG. 1 there is shown a combined electro-osmotic cell and product cell as 1, the electro-osmotic being indicated at 2 and the product cell at 3. The electro-osmotic cell 2 is of the general character as shown diagrammatically in patent to E. V. Hardway, Jr. supra. The electro-osmotic cell 2 of the instant invention comprises a housing at 2 which is divided into the two chambers indicated generally at 5 and 6. The two chambers of the electro-osmotic cell are separated by a porous ceramic disc 7. This disc resembles a filter and provides a plurality of capillary tubes extending therethrough. Disposed in close adjacency to the opposite surfaces of the disc is a pair of depolarizing electrodes 9 and 10 of platinum or the like substantially as shown. These electrodes are connected to an external circuit in a manner whereby a voltage as applied across the electrodes produces a current flow and effects a unidirectional flow of fluid through the porous filter. With an applied voltage of suitable polarity this flow is in the direction from chamber 5 to 6 and produces a distending movement of the diaphragm 8 until an equilibrium is reached wherein the pressure of the water or other contained fluid equals the back pressure applied by the diaphragm, after which the fluid leaks back through the disc. Prior to this equilibirum the diaphragm 8 effects a movement of the fluid in the chamber 12 of the second unit of the product cell 3. This second cell 3 which contains water in the chamber 12 and mercury in the chamber 13 is provided with a diaphragm at 16 to enclose the mercury chamber and these two chambers are interconnected by a passage 14 which provides a water-mercury interface at 15. The position of this interface is movable in accordance with movement of the diaphragm 8 as effected by action of the electro-osmosis driver cell. Disposed in this the interconnecting passage is a length of resistance wire 17, the effective length L of which is indicated schematically in FIG. 2 and represented by R. As the water-mercury interface is caused to move along this resistance wire 17 a variable tap on the resistance is effected. If a current is caused to flow in the resistance element and connections are made thereto to derive an output voltage indicative of the current flow across this cell, a linear output is provided.

Since the movement of the interface is a linear relationship with respect to the movement produced by the electro-osmotic driver, the output reflected in the output across the output terminals $E_C$ provides for a voltage output signal which is proportional to the product of the current utilized to drive the electro-osmotic cell device and the current flowing in the circuit including the variable resistance.

Reference to FIG. 2 will indicate the manner in which the output is obtained for the second or product cell portion of the device 1 if it be considered that the interface indicated as the variable tap on the resistance is caused to move in a linear manner. Since this movement is responsive to the action of the electro-osmotic cell, it is deemed apparent that an output is obtained which is a product function of the two input currents $I_A$ and $I_B$. This output as derived across the resistance R appears as a voltage signal at the terminals $E_C$.

It is thus deemed apparent that the value of $E_C$ will be $I_B R$ and since $R = k_2$, $I_A$ will be equal to $k_2$, $I_A$ and $I_B$ as hereinbefore set forth.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The combination of an electro-osmotic cell and a product cell wherein the product cell is directly coupled to said electro-osmotic cell, said product cell comprising means providing a plurality of fluid chambers, means for interconnecting said chambers including a metal tube for providing fluid communication therebetween, a diaphragm closing a first of said chambers and disposed to be common to said electro-osmotic cell in a manner adapted to be driven thereby, a quantity of water in said first chamber of said product cell, a said second chamber, said second chamber being closed by a flexible diaphragm member, said second chamber containing a quantity of mercury, an electrical resistance wire means axially disposed longitudinally of said metal passage, circuit means connecting said resistance means with a source of current, means including a source of current for energizing said electro-osmotic cell said electro-osmotic cell comprising a casing, a porous separating means centrally disposed in said casing in a manner to divide the same substantially into a pair of fluid chambers, a pair of electrodes of depolarizing materials disposed adjacent said porous separating means in a manner to provide for a capillary flow of fluid through said separator in response to application of a current thereto from said current source for the electro-osmotic cell, and means for deriving a signal output from said product cell which is proportional to the product of the current applied to the electrodes of said electro-osmotic cell and the current flowing in said resistance means, said electro-osmotic cell having the said common diaphragm closing one chamber thereof and an additional flexible diaphragm for closing a second chamber thereof.

2. The combination in a product circuit, of an electro-osmotic cell and a directly coupled product cell wherein said product cell comprises means driven by said electro-osmotic cell for linearly varying the resistance to current flow in said circuit, and means for deriving an output from said variable resistance means which is proportional to the product of the current applied to said electro-osmotic cell and the current flowing in the variable resistance means of said product cell.

3. The combination of structure of claim 2 further including a first diaphragm member for the electro-osmotic cell, a second diaphragm common to the electro-osmotic cell and the product cell and a third diaphragm for closing the product cell in a manner whereby an equilibrium condition is provided between the driving action of the electro-osmotic cell and the varying of the resistance of the variable resistance means driven thereby.

4. The combination of structure of claim 3 further including in said means for varying the resistance to current flow in said product cell, of means providing a pair of chambers and a fluid communication passage therebetween, a first of said chambers being filled with water and the second chamber being filled with mercury in a manner to provide a mercury-water interface in said passage, and a circuit including a resistance wire disposed in said passage, said interface being movable in response to driving action of the electro-osmotic cell to provide variations in the effective length of said wire in a linear relationship with the current flowing in said electro-osmotic cell.

No references cited.

MILTON O. HIRSHFIELD, *Primary Examiner.*

CHESTER L. JUSTUS, NORMAN H. EVANS,
*Examiners.*

P. H. BLAUSTEIN, J. W. GIBBS, JR.,
*Assistant Examiners.*